United States Patent Office 3,234,000
Patented Feb. 8, 1966

3,234,000
PROCESS FOR THE STIMULATION OF THE GROWTH AND OF THE YIELD OF PLANTS
Marga Bartels, Rolf Zimmermann, and Norbert Taubel, all of Wiesbaden, Germany, assignors to Chemische Werke Albert, Wiesbaden-Biebrich, Germany, a corporation of Germany
No Drawing. Filed Oct. 10, 1961, Ser. No. 147,389
Claims priority, application Germany, Mar. 24, 1959, C 18,657
10 Claims. (Cl. 71—2.5)

This invention relates to the stimulation of the growth and yield of plants by feeding the plants with certain substituted ureas. It is a continuation-in-part application of our application 16,147, filed March 23, 1960, now abandoned.

It has already been described that a number of derivatives of urea are biologically active. Thus Patent 2,733,988 states compounds of the formulae

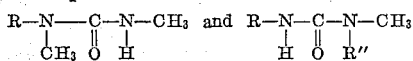

wherein R is an acyclic aliphatic radical containing from 2 to 6 carbon atoms inclusive and R" is hydrogen or an aliphatic hydrocarbon radical of 1 to 4 carbon atoms inclusive to be suitable as the active ingredient of herbicidal compositions. These compositions also contain a carrier material or conditioning agent of the kind used and referred to in the art as a pest control adjuvant or modifier in order to provide formulations adapted for ready and efficient application to soil, weeds, or unwanted plants. As is stated in said patent, these substituted ureas are, of course, applied in an amount sufficient to exert the desired plant killing action. Besides, Patent 2,981,739 describes substituted ethylene thioureas which are suitable for controlling the growth of microorganism, or also for preventing undesirable plant growth. Patent 2,785,176 describes compounds of the formula

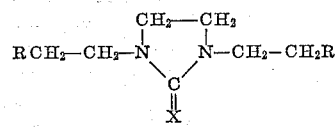

wherein X is oxygen or sulfur and R is —COOH, —COO (lower alkyl) or —CN.

As far as the aforementioned compounds are described to be biologically active, they are expressly stated to have a life killing action (U.S. Patent 2,981,789) and fungicidal and insecticidal action (U.S. Patent 2,785,176).

In view of this art our invention is extremely surprising, according to which certain derivatives of urea when applied in small amounts may be used for stimulating the growth and increasing the yield of plants with excellent results. This effect is quite contrary to what had to be expected from a review of the art.

The derivatives of urea useful for the process of the invention have the formula

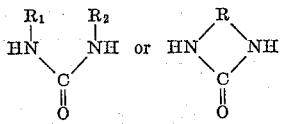

wherein at least one of the radicals $R_1$ and $R_2$ is an alkyl radical of 1 to 4 carbon atoms, while the other one represents hydrogen, or wherein R is a part of a ring system, i.e., R is selected from the groups

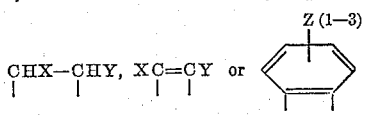

Thus the last-mentioned compounds suitable for the process of the invention may be considered as cyclically substituted ureas, or, in other words, as imidazolidone-2, imidazolone-2, benzimidazolone-2, or derivatives thereof. More specifically $R_1$ and/or $R_2$ may be the methyl, ethyl, propyl, isopropyl, butyl, sec. butyl, isobutyl or tert. butyl radicals. Preferably one of the radicals $R_1$ and $R_2$ is either hydrogen or a tertiary butyl radical. The most preferred compounds are those, in which $R_1$ and $R_2$ together contain from 1 to 4 carbon atoms. X and/or Y may be hydrogen or any one of the aforementioned alkyl radicals or a furyl, thienyl, pyridyl or aryl radical. The aryl radicals may be phenyl, tolyl, benzyl, ethylphenyl, cymyl, cumyl or xylyl radicals as well as the nuclear-substituted alkoxyderivatives thereof. $R_1$ and $R_2$ as well as X and Y may be equal or different from each other. In the benzimidazolones 1 to 3 radicals Z may be present. Z may be a halogen, alkyl, amino, alkoxy or acyl radical. If the benzene nucleus contains more than one radical Z, the various radicals Z may also be equal or different from each other. However they are selected in a manner that the various radicals Z do not interfere with each other. Wherever halogen is referred to as a substituent, chlorine is preferred, while the alkoxy groups, wherever referred thereto, contain from 1 to 4 carbon atoms. The hydrocarbon groups of the alkoxy or alkyl radicals of the benzimidazolones may be any one of the above-mentioned groups, while the acyl group may, for example, be the acetyl, propionyl, butyryl, capronyl, lauroyl, myristyl, stearyl or oleyl groups. The preferred benzimidazolones are those which contain only one radical Z and these which contain up to three methyl radicals Z.

The following urea derivatives may be specifically mentioned as active ingredients of compositions which stimulate plant growth and heighten their yields: N-tert.-butyl urea; N,N'-di-tert.-butyl urea; N,N'-dimethyl urea; imidazolidone-2; imidazolone-2; 4,5-bis-[furyl-(2)-]-imidazolone-2; 4,5-bis-[pyridyl-2]- or 4,5-bis-[thienyl]-imidazolone-2; 4,5-bis-[phenyl]-imidazolone-2; 4,5-dimethyl-imidazolone-2; or the corresponding 4,5-disubstituted imidazolones; benzimidazolone-2; 5-chlorobenzimidazolone-2; 5-methoxybenzimidazolone-2, 6-amino-benzimidazolone-2, or the mono- or di-methylaminobenzimidazolones, 5-acetyl-benzimidazolone-2; 5-myristylbenzimidazolone-2; 5-butyryl-benzimidazolone-2; 5,6-dimethylbenzimidazolone-2; 4,5,6-trimethyl-benzimidazolone-2.

The compositions of this invention may be employed to regulate the growth of plants of widely differing nature. For example, at a suitable rate of application they may be used to stimulate the growth of crops of many kinds as well as to improve the development of blossom and fruit. In addition they appear to increase the resistance of plants to withering.

Actually the substituted ureas hereof are effective in such small amounts that they are normally applied in combination with other active plant treating substances or with inert substances which serve as a carrier for the substituted ureas.

The growth-promoting action of the urea derivatives in compositions according to the invention is surprising. If one would ignore the above-mentioned art at the most it might have been expected that a urea derivative would have a nutritive effect equivalent to its nitrogen-content, comparable for example with urea itself.

Surprisingly, however, experiments, especially the comparative experiments with unsubstituted urea, show that the effectiveness of the substituted ureas of this invention on the growth and the yield of plants is by far greater than that of the unsubstituted urea. Therefore, the effect cannot be attributed solely to the known nutritive effect of urea.

Suitable carriers for use in the compositions according to the invention include both solid and liquid carriers. Liquid compositions according to the invention may be in the form of solutions, emulsions or suspensions, in water or suitable organic solvents of a non-phytotoxic nature. Liquid compositions may include one or more dispersing, emulsifying, suspending, wetting, nutritional, plant-growth stimulating, fungicidal, bactericidal, insecticidal, acaricidal and/or solid-improving agents.

In the preparation of emulsions containing the active urea derivatives, the urea derivatives may first be dissolved in an organic solvent, since they are generally solid at normal ambient temperatures. The solution of urea derivative may then be converted into an emulsion in water, preferably using one or more suitable emulsifying agents.

The concentration of urea derivative obtainable in an aqueous solution (which may contain other ingredients) is generally fairly low. Thus N-tert.-butyl-urea and benzimidazolone-2 have a solubility of 0.00025% in distilled water at room temperature, and N,N'-di-tert.-butyl-urea a solubility of 0.0003% under the same conditions. However, imidazolidone-2 has a solubility of 40% under these conditions, thus permitting the preparation of highly concentrated solutions of this compound.

Solid compositions according to the invention are preferably in the form of dusts and are compounded to give homogeneous free-flowing dusts, granulates or wettable powders by admixing the active compound with finely divided inert diluents, e.g., clays, chalk, talcs, diatomaceous earth, earth, peat or flours such as walnut shell or redwood flours. The solid carrier may also include nutritional, other plant-growth stimulating, fungicidal, bactericidal, insecticidal, acaricidal, soil-improving agents, binding agents and also humus substances. Solid compositions according to the invention may be applied in any convenient form, for example as dusts, granulates and wettable powders, etc. For the preparation of dispersions it is generally preferable to mix the urea derivative with a suitable solid carrier. The solids should of course be finely ground.

Further examples of substances which may be employed in association with urea derivatives in compositions according to the invention include for example micro-nutrients, such as the trace elements copper, manganese and boron, macro-nutrients such as superphosphate, potassium and nitrogenous compounds.

As is evident from the foregoing description, the plants may be fed with these substituted ureas in practically all known ways of feeding plants.

The compositions according to the invention may be employed at any suitable time. Thus, for example, soil may be treated before sowing seed, the seed may itself be treated, or the growing plant may be treated at a sufficiently early period for the treatment to have a suitable effect. For treating growing plants an advantageous method of application is by spraying a liquid composition according to the invention. More than one application of a composition according to the invention during the life of a plant may, of course, be carried out.

A further advantage of the invention resides in the readiness with which the urea derivatives used can be prepared. Thus, for instance benzimidazolone-2 may be prepared in good yield by reacting o-phenylene diamine with urea in anhydrous glacial acetic acid. Furoin, acetoin or benzoin may be reacted with urea, suitably in an acetic acid solution, to yield the corresponding 4,5-disubstituted imidazolone-2 derivatives.

The urea compounds of the invention are used in an amount sufficient to stimulate the growth of the plant, but in an amount insufficient to exert a herbicidal action. If the seed is treated with a composition containing these agents, these agents, suitably are applied in an amount between about 0.5 and 100 grams per hectare (100 x 100 meters), preferably between about 1 and 75 grams. Of course, the suitable amount depends on the species of plant. For example, good results are already obtained by using only 1.2 grams per that amount of rape-seed which is required for one hectare, while for stimulating the growth of wheat 25 to 50 grams have been proved satisfactory. When mixing the urea-derivatives with a carrier, such as indicated above, e.g., earth, of course larger amounts have to be used in order to supply the plant with the same amount of the urea derivative as by directly treating the seed with it or a composition containing it. When supplying the urea derivatives by spraying the leaves, aqueous solutions containing about 0.0025 to 0.00025 percent may be used. Of course, more concentrated solutions, e.g., containing about 0.025 percent, may be used if a solvent, such as alcohol, acetone or methylpyrrolidone, is added so as to increase the dissolving capacity of the liquid medium. When spraying liquid solutions or suspensions of the urea derivatives, these are applied in such an amount that the plant absorbs the same portion of the urea derivative as by treating the seed, necessary for one hectare, with about 0.5 to 100 grams of said urea derivative.

The preceding description of the invention and its advantages does not include all of the advantages of the invention. The tables and the examples contained herein only relate to representative substituted ureas and the method by which they are fed to the particular plant. For the sake of clarity the experiments are presented in tabular form and consecutively numbered. In order that the invention may be well understood the following examples are given by way of illustration only.

*Example 1.—Aqueous solution containing water-soluble nutrients*

A Knop nutrient solution containing N-tert.-butyl urea is made up by dissolving the following substances in 100 cc. water:

| | G. |
|---|---|
| Calcium nitrate | 1.00 |
| Magnesium sulphate | 0.25 |
| Potassium dihydrogen phosphate | 0.25 |
| Potassium chloride | 0.12 |
| N-tert.-butyl urea | 0.025 |

To this solution is added 1 cc. of a 5% solution of $FeCl_3.5H_2O$. For application the solution is diluted with water in a ratio of nutrient solution to water of 1 to 10. The solution is suitable for so-called hydroculture.

*Example 2.—Composite fertilizer solution containing macro- and micro-nutrients*

A 0.1 to 0.5% aqueous solution is produced from the following mixture:

| | Parts by weight |
|---|---|
| Monoammonium phosphate | 16.4 |
| Mixture of ammonium sulphate and ammonium nitrate | 27.0 |
| Urea | 13.0 |
| Anhydrous magnesium sulphate | 0.4 |
| Manganese sulphate ($.1H_2O$) | 0.9 |
| Copper sulphate ($.5H_2O$) | 0.5 |
| Zinc sulphate ($.1H_2O$) | 0.1 |
| Boric acid | 0.5 |
| N,N'-di-tert.-butyl urea | 1.2 |

This solution may be used directly, or for so-called leaf fertilizing may be diluted to a concentration of 0.1 to 0.2%.

*Example 3.—Emulsion*

1.66 parts of benzimidazolone-2, 50 parts ethanol and 25 parts of cyclohexanone are heated to boiling under a reflux condenser. 5 parts olive oil and 1 part of emulsifying agent (a polyethylenealkyl ether) are gradually added. Upon dilution with water an emulsion is obtained, which can be used for spraying.

Example 4.—Dry compositions 10 parts by weight of imidazolone-2 are intimately mixed with 85 parts by weight of talc as carrier and 5 parts by weight of a dispersing agent (a commercially available polyethylene oxide adduct), and then finely ground. This composition is used for dusting, or alternatively mixed with fine sand, and used for scattering. The finely ground composition may also be made up as a dispersion for spraying. Using kaolin or prepared chalk as carrier, the composition is applied as a 0.01 to 0.1% dispersion in water.

Example 5.—Seed-treating compositions

A. *Combination with insoluble, but resorbable micro-nutrients.*—The following are mixed dry with 5 to 20 parts of 4,5-di-(furyl)-imidazolone-2:

| | Parts by weight |
|---|---|
| Calcium borate | 15 to 30 |
| Cuprous oxide | 15 to 30 |
| Manganous oxide and a filler such as talcum in an amount sufficient to form 100 parts | 30 to 60 |

All the components are used in a finely ground condition. To improve adhesion and hence reduce dust, 2 to 4 parts by weight of spindle oil are worked into the composition, while for identification 0.05 to 1 part by weight of a dye may also be incorporated. Seed is treated dry with this composition.

B. *Combination with the same micro-nutrients and fungicides.*—Into the mixture of Example 5A above are worked in addition 1 to 10 parts by weight of organic mercury compound, namely methoxyethyl-mercury benzoate and/or 5 to 20 parts by weight of hexachlorophenol or pentachloronitrobenzene.

If it is desired simultaneously to control insects, for example wire worms, insecticides such as hexachlorocyclohexane, aldrin and dieldrin, may be added to an extent of 20–40% by weight of the seed-treating composition. Corresponding reductions in the amount of manganous oxide should preferably be made when adding these insecticides.

Example 6.—Compositions containing macro-nutrients

A. 0.2 to 0.5% of 4,5-dimethyl-imidazolone-2 are added to superphosphate fertilizer.

B. 1.2 parts by weight of 4,5-dimethyl-imidazolone-2 are worked into the mixture of Example 2, and the composite fertilizer so obtained applied in the solid state.

C. The dry composition of Example 2 is first made up without a urea derivative, and then the 5-chloro-benzimidazolone is dusted onto the composition in a slightly damp, granulated form. For this the urea derivative is mixed before dusting with dry talc.

D. The composition described in Example 2 is worked into a paste, or formed into kernels, balls, rods or other suitably shaped bodies for fertilizing, using a suitable binding-agent, such as a solution of a glue.

Example 7.—Composition with inert solid carriers 2 to 5 mg. of N,N'-dimethyl urea are mixed into each litre of a mixture of earth and sand, and this composition applied in any convenient manner.

A number of experiments were also conducted in order to illustrate the growth-promoting action of the urea derivatives of the compositions according to the invention. The results of these experiments are presented in tabular form, each table representing experiments conducted on a particular species of plant.

The growth-promotion action of the urea derivatives used according to the invention is first shown by the cress root test (cress=*Lepidium satidum*) carried out by the plate method of Flaig and Otto (Landwirtschaftliche Forschung, vol. 3, page 66 (1951/52)). To a 1/10 Knop nutrient solution (cp., e.g., Schropp, Die Methodik der Wasserkultur höherer Pflanzen, page 132, Neumann-Verlag, 1951) is added 2.5 mg. of urea derivative per litre, and the length of the roots is measured after 6 days.

TABLE 1.—DEMONSTRATION OF ACTIVITY BY THE CRESS ROOT TEST

[Amount of urea derivative: 2.5 mg. per litre of 1/10 Knop nutrient solution; measurement after 6 days]

| Exp. No. | Urea derivative | Average length of root in millimetres | | Number of individual measurements |
|---|---|---|---|---|
| | | Absolute | Relative | |
| 1 | Control without urea derivative | 146 | 100 | 98 |
| 2 | N,N'-di-tert.-butyl urea | 162 | 111 | 108 |
| 3 | Imidazolidone-2 | 168 | 115 | 102 |
| 4 | 4,5-di-[furyl-2]-imidazolone-2 | 162 | 111 | 101 |
| 5 | Benzimidazolone-2 | 164 | 112 | 95 |

As is shown in the table, the growth of the cress roots is increased by 11–15% by the addition of the urea derivative. For greater accuracy, a large number of individual measurements were carried out each time.

In a further series of experiments, growth-promoting urea derivatives were incorporated in a seed-treating composition according to German application P 10,021, which consisted of the micro-nutrients copper, boron and manganese in a sparingly soluble form and absorbable by the plant, but otherwise contained no further additives. As is known, these micro-nutrients are called, at times, trace elements. After thorough incorporation of the substituted urea ingredients in this substance, the seed was dry processed in the usual manner. Yellow oats (*Avena sativa*=Flämingstreue) served as test plants; the experiments were carried out in Mitscherlich vessels, and the results evaluated in the usual form.

The amount of urea derivative used was 18 parts by weight to 100 parts by weight of seed-treating agent, corresponding to 1.5 mg. of urea derivative per vessel.

TABLE 2.—VESSEL EXPERIMENT WITH YELLOW OATS
[Seed treatment with sparingly soluble micro-nutrients and urea derivative corresponding to 1.5 mg. per vessel]

| Exp. No. | Urea derivative | Yields in grams | | | | | | | | |
|---|---|---|---|---|---|---|---|---|---|---|
| | | Total | | | Grain | | | Straw | | |
| | | Average | Dev. ± | Rel. | Average | Dev. ± | Rel. | Average | Dev. ± | Rel. |
| 6 | Control without urea derivative | 49.2 | 0.95 | 98 | 21.2 | 0.01 | 100 | 28.0 | 0.98 | 96 |
| (9) | Control with added Hg | 50.4 | 0.72 | 100 | 21.1 | 0.24 | 100 | 29.3 | 0.48 | 100 |
| 7 | 4,5-[di-furyl-(2)]-imidazolone-2 | 55.4 | 0.87 | 100 | 24.2 | 0.97 | 115 | 31.2 | 1.20 | 107 |
| 8 | N,N'-di-tert.-butyl urea | 56.2 | 0.66 | 111 | 24.3 | 0.20 | 115 | 31.9 | 1.50 | 109 |

In this and the following table the column "rel." means relative values which are referred to the control substance; Av.=means Average and Dev.=Deviation. For comparison purposes Experiment 9 of Table 3 is included herein.

The next series of experiments was carried out with a seed-treating agent which contained the same sparingly soluble, absorbable mixture of micro-nutrients (Cu, Mn, B) and in addition 2% of organically combined mercury (methoxy ethyl-mercuric benzoate); the urea derivatives of compositions according to the invention are worked into this composition, and the seeds are treated dry. The experiments were carried out in Mitscherlich vessels with the same test plant (yellow oats) as in Table 2. The amount of urea derivative used was varied as follows:

Experiment No. 10: 6 parts by weight of urea derivative to 100 parts by weight of seed-treating composition = 0.5 mg. of urea derivative per vessel Experiment No. 11: 18 parts by weight of urea derivatives to 100 parts by weight of seed-treating composition = 1.5 mg. of urea derivative per vessel Experiment No. 12: 6 parts by weight of urea derivative to 100 parts by weight of seed-treating composition = 0.5 mg. of urea derivative per vessel TABLE 3.—VESSEL TESTS WITH YELLOW OATS
[Seed treatment with sparingly soluble, absorbable micro-nutrients, 2% organically combined mercury and urea derivatives]

| Exp. No. | Urea derivative | Yields in grams | | | | | | | |
|---|---|---|---|---|---|---|---|---|---|
| | | Total | | | Grain | | | Straw | | |
| | | Average | Dev. ± | Rel. | Average | Dev. ± | Rel. | Average | Dev. ± | Rel. |
| 9 | Control without urea derivative | 50.4 | 0.72 | 100 | 21.1 | 0.24 | 100 | 29.3 | 0.48 | 100 |
| 10 | Benzimidazolone-2 | 56.0 | 0.49 | 111 | 23.5 | 0.46 | 111 | 32.1 | 0.75 | 110 |
| 11 | do | 57.4 | 0.67 | 114 | 24.0 | 0.69 | 114 | 33.4 | 0.22 | 114 |
| 12 | N,N'-di-tert.-butyl-urea | 56.3 | 1.7 | 112 | 23.3 | 0.30 | 110 | 33.0 | 1.45 | 113 |

The growth-promoting action of the urea derivatives in the above table appears to be uniform for both grain and straw relative to the control sample.

6 parts by weight to 100 parts by weight of seed-treating composition = 0.5 mg. of urea derivative per vessel.

TABLE 4.—VESSEL TESTS WITH GREEN PEAS
[Seed treatment with sparingly soluble micro-nutrients, 2% of organically combined mercury and 0.5 mg. of urea derivative per vessel]

| Exp. No. | Urea derivative | Yields in grams | | | | | |
|---|---|---|---|---|---|---|---|
| | | Fresh weight | | | Dry weight | | |
| | | Avg. | Dev. ± | Rel. | Avg. | Dev. ± | Rel. |
| 13 | Control without urea derivative | 127.9 | 3.8 | 100 | 21.8 | 0.76 | 100 |
| 14 | Benzimidazolone-2 | 150.6 | 2.34 | 118 | 26.1 | 0.30 | 120 |
| 15 | 4,5-di-[furyl-2]-imidazolone-2 | 148.9 | 0.97 | 116 | 25.2 | 0.54 | 116 |
| 16 | N,N'-di-tert.-butyl-urea | 152.3 | 2.32 | 119 | 25.8 | 0.64 | 118 |

The effectiveness of the urea derivatives in compositions according to the invention can clearly be seen.

Green maize (Zea mais = country maize from Baden) served as test plant in the next series. The seed was treated dry as in the previous experiments with a mixture of sparingly soluble micro-nutrients, 2% of organically combined mercury and urea derivatives and then placed in Mitscherlich vessels.

In one case (Experiment 18), dry unsubstituted urea itself was worked into the seed-treating composition in such a quantity that the composition contained 5.7% of nitrogen. This corresponds approximately to the quantity of nitrogen contained in the compositions containing urea derivatives according to the invention.

TABLE 5.—VESSEL TESTS WITH GREEN MAIZE
[Seed treatment with sparingly soluble micro-nutrients, 2% of organically combined mercury and urea derivatives. In Experiment 18, the added urea corresponds to 5.7% N. In Experiment 23, the urea derivative was applied by leaf-spraying]

| Exp. No. | Urea derivative | Addition by— | Amount | Yield/dry substance | | |
|---|---|---|---|---|---|---|
| | | | | Avg. | Dev. ± | Rel. |
| 17 | Control without urea derivative | | | 88.6 | 1.55 | 103 |
| 18 | Control plus urea | | | 85.7 | 1.55 | 100 |
| 19 | N-tert.-butyl-urea | Seed-treating composition | 1.0 mg./vessel | 104.8 | 2.16 | 122 |
| 20 | N,N'-di-tert.-butyl-urea | do | 0.5 mg./vessel | 92.4 | 1.64 | 108 |
| 21 | Benzimidazolone-2 | do | 0.5 mg./vessel | 106.6 | 2.56 | 124 |
| 22 | do | do | 1.0 mg./vessel | 97.5 | 2.85 | 114 |
| 23 | N-tert.- and N,N'-di-tert.-butyl-urea 1:1 in 0.0025% aqueous solution. | Leaf-spraying | 2×10 ml. of the solution. | 96.7 | 3.62 | 113 |

These urea derivatives had a similar action in experiments with green peas (Pisum sativum = pink-flowering Hohenheimer) likewise carried out in Mitscherlich vessels. The seed was treated with the mixture of sparingly soluble micro-nutrients, 2% of the same organically combined mercury and urea derivatives.

Amount of urea derivative in all experiments (control excepted):

The results of this table are informative in several respects. Experiment 18 shows the action of unsubstituted urea acting as a source of nitrogen. Comparison with Experiments 19 to 23 shows that the activity of the urea derivatives used in accordance with the invention is substantially greater and exceeds the effect of simple nitrogen addition. This was unexpected, since the nitrogen is more firmly bound in the urea derivatives than in the unsubstituted urea, so that a slower absorption by the plant would be expected to occur. Putting the value for urea at 100 as has been done here, then the urea derivatives used according to the invention caused an increase of yield of up to 24%.

Experiment 23 shows on the one hand that more than one urea derivative can be used at once, and on the other hand that application by means of leaf-spraying, using highly dilute solutions is both possible and effective.

The following tables contain experimental results for broad beans (*Vicia faba*) in Mitscherlich vessels:

Table 6, Experiments 24 to 30: addition of urea derivative by seed-treating composition as described above.

Table 7, Experiments 31 to 37: addition of urea derivative by leaf-spraying with highly dilute solutions.

Table 8, Experiments 38 to 42: addition of urea derivative by mixing into the soil, similar to the so-called crumb fertilisation.

TABLE 6.—VESSEL TESTS WITH BROAD BEANS
[Seed treatment with sparingly soluble micro-nutrients, 2% of organically combined mercury and urea derivatives]

| Exp. No. | Urea derivative | Application, mg. per vessel | Yields/dry substance | | |
|---|---|---|---|---|---|
| | | | Avg. | Dev. ± | Rel. |
| 24 | Control without urea derivative. | | 23.1 | 1.20 | 100 |
| 25 | Control plus urea | | 23.6 | 1.13 | 102 |
| 26 | N-tert.-butyl-urea | 0.8 | 25.5 | 1.03 | 110 |
| 27 | ...do... | 1.6 | 27.2 | 0.32 | 118 |
| 28 | N,N'-di-tert.-butyl-urea | 1.6 | 26.6 | 0.41 | 115 |
| 29 | Imidazolone-2 | 1.6 | 26.2 | 0.88 | 114 |
| 30 | ...do... | 2.4 | 27.8 | 1.02 | 120 |

The control experiment with urea (No. 25) here also confirms its low activity compared with the urea derivatives used according to the invention.

TABLE 7.—VESSEL TESTS WITH BROAD BEANS
[Seed treatment with sparingly soluble micro-nutrients, 2% of organically combined mercury. Addition of active composition by leaf-spraying with 0.0025% solutions]

| Exp. No. | Urea derivative | Application, ml. per vessel | Yields/dry substance | | |
|---|---|---|---|---|---|
| | | | Avg. | Dev. ± | Rel. |
| 31 | Control without urea derivative. | | 23.1 | 1.2 | 100 |
| 32 | N-tert.-butyl-urea | 2×10 | 25.9 | 0.49 | 112 |
| 33 | N,N'-di-tert.-butyl urea | 2×10 | 25.5 | 0.64 | 110 |
| 34 | N-tert.- and N,N'-di-tert.-butyl urea (1:1). | 2×10 | 25.7 | 0.35 | 111 |
| 35 | Imidazolidone-2 | 2×10 | 27.1 | 0.91 | 117 |
| 36 | Imidazolone-2 and benzimidazolone-2 in a ratio of 1:1. | 2×10 | 27.8 | 0.32 | 120 |
| 37 | N-tert.- and N,N'-di-tert.-butyl urea, imidazolone-2 and benzimidazolone-2 (1:1:1:1). | 2×10 | 27.9 | 1.14 | 121 |

The results achieved by means of leaf-spraying of the highly dilute solutions (0.0025%) are of the same order of magnitude as those obtained by means of seed treatment. Thus this recently developed method of applying macro- and micro-nutrients, insecticides, etc., can also be used for the application of compositions according to the invention. The solutions of the active substances can be applied in one or more sprayings, and wetting agents and the like may also be incorporated in the solutions. Fine distribution also increases activity of the urea derivatives.

For applying the urea derivatives by means of so-called crumb fertilisation, 10 mg. of urea derivative were thoroughly mixed with the total quantity of soil in individual Mitscherlich vessels (6 kg.). The soils received in addition a uniform fertilisation with the macro-nutrients phosphate, potassium and nitrogen. Since the fertilisation of the soil was carried out uniformly in all experiments of this series, it can be ignored when assessing the results.

TABLE 8.—VESSEL TESTS WITH BROAD BEANS
[Seed treatment with sparingly soluble micro-nutrients, 2% of organically combined mercury, and 10 mg. of urea derivative worked into 6 kg. of soil. Uniform ground-fertilisation with phosphorus, potassium and nitrogen]

| Exp. No. | Urea derivatives | Yields/dry substances | | |
|---|---|---|---|---|
| | | Avg. | Dev. ± | Relative |
| 38 | Control without urea derivative | 23.1 | 1.20 | 100 |
| 39 | N-tert-butyl-urea | 25.7 | 1.13 | 111 |
| 40 | N,N'-di-tert.-butyl-urea | 26.8 | 0.73 | 116 |
| 41 | Imidazolidone-2 | 26.0 | 0.51 | 113 |
| 42 | Benzimidazolone-2 | 26.0 | 1.20 | 113 |

Further experiements were carried out with a typical leaf plant, namely with spinach (sharp-seed winter). Here a simple increase of growth may be equated with an increase of yield.

The experiments were carried out in seedling boxes under open country conditions. The seed was treated with the above-mentioned micro-nutrient mercury seed-treating composition into which the urea derivatives had been worked, and sowed each time in 4 rows, at a rate of one gram of seed per linear metre.

TABLE 9.—BOX EXPERIMENTS WITH SPINACH
[Open country conditions, seed treatment with sparingly soluble micro-nutrients, 2% of organically combined mercury and urea derivatives]

| Exp. No. | Urea derivative | Application [1] | Yields | | | |
|---|---|---|---|---|---|---|
| | | | Fresh weight | | Dry weight | |
| | | | Grams | Rel. | Grams | Rel. |
| 43 | Control without urea derivative | | 336.5 | 100 | 31.7 | 100 |
| 44 | N-tert.-butyl-urea | 12 | 497.7 | 142 | 47.3 | 149 |
| 45 | N,N'-di-tert.-butyl-urea | 12 | 428.1 | 127 | 38.0 | 120 |
| 46 | Imidazolidone-2 | 12 | 426.8 | 127 | 39.9 | 126 |
| 47 | Benzimidazolone-2 | 6 | 448.6 | 133 | 43.4 | 137 |
| 48 | ...do... | 12 | 513.6 | 152 | 48.2 | 152 |

[1] Parts by weight of urea derivative per 100 parts of seed-treating composition.

The growth or yield increase is here particularly significant. Thus in one case it amounts to more than 50%, otherwise from 27 to 42%.

In a further series of experiements seeds of forest trees were treated dry with a mixture of sparingly soluble but resorbable micro-nutrients and urea derivatives, such as are described in Tables 3 to 8.

The growth-promoting influence of the active substances according to the invention on the seed of *Quercus rubra* and *Fagus silvatica* first became apparent in that compared with the untreated controls, a substantially larger number of fruit germinated, whereupon also the young plants showed a stronger development; subsequently a stronger development and widening of the leaves took place.

In another series of experiments year-old seedlings of forest pine (*Pinus silvestris*) were dipped into 0.002 to 0.02% aqueous solutions of the active urea derivatives for 5 to 10 minutes and planted immediately thereafter.

Compared with the untreated controls the number of seedlings which took root was first substantially higher, and very soon the treated plants showed an increased needle formation and a stronger growth in length. Their development was in general also stronger.

As is shown in the following series of experiments the urea derivatives used according to the invention are suitable not only for promoting the growth of useful plants, but also of ornamental plants.

N-tertiary butyl urea was dissolved in a mixture of ethanol and water (1:1) with the addition of a small quantity of a commercially available dispersing agent (an ethylene oxide condensation product) to yield a 5% solution, and this solution was then diluted with water in the ratio of 1:500.

Then 20 cc. of this dilute solution were used for pouring on seedlings of the Alpine violet (*Cyclamen persicum*) which were grown in pots in a layer of peat; each pot containing 500 g. of peat. Test plants and untreated controls were treated with a well-balanced ground-fertilizer (2 g. per litre of peat) containing phosphorus, potassium and nitrogen, as in Table 8, small quantities of the micro-nutrients Mn, Cu, B in the form of water-soluble salts, and in addition 3 g. of calcium carbonate. The figures of the table are mean values for 5 plants each time.

TABLE 10.—POT TEST WITH SEEDLINGS OF *CYCLAMEN PERSICUM*

| Exp. No. | Urea derivative | Widths of leaves in cm. after— | | Number of leaves [1] after 20 weeks | Flowers and buds after 22 weeks |
|---|---|---|---|---|---|
| | | 6 weeks | 20 weeks | | |
| 49 | Control without urea derivative | 6 | 7.8 | 31 | 1 | 1 |
| 50 | 2×2 mg. of N-tert.-butyl-urea | 10 | 12 | 40 | 8 | 3 |
| 51 | 2×4 mg. of N-tert.-butyl-urea | 10 | 12 | 44 | 7 | 1 |

[1] Fully grown leaves.

It is seen, the N-tert.-butyl urea strikingly stimulated the growth and the flowering of this primulaceous plant.

The foregoing description and illustrative embodiments of the invention has shown that the substituted ureas hereof serve to stimulate the growth of a very wide variety of plants when used in very small quantities. Their effectiveness as plant stimulants therefore makes the use of active or inactive extenders or diluents advisable which may also be called "carrier diluents."

For any particular plant, or type of plant, the appropriate amount of the substituted urea can be determined easily by growing small plots of plants experimentally as is customary in agricultural experiment stations.

It will be apparent to those skilled in the agricultural arts that embodiments of the invention, other than those specifically described for illustrative purposes, may be evolved and that modifications in these specific embodiments may be made without departing from the spirit and the scope of the invention as expressed above and as defined in the appended claims.

What is claimed is:

1. A process for stimulating plant growth which comprises feeding the plant in an amount sufficient to stimulate the growth of the plant but in an amount insufficient to exert a herbicidal action, with a compound of the formula

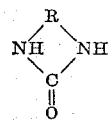

wherein R is selected from the group consisting of

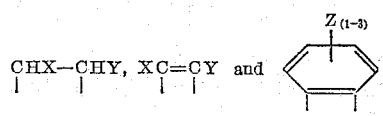

in which X and Y are selected from the group consisting of hydrogen, alkyl of 1 to 4 carbon atoms, furyl, thienyl, pyridyl and aryl, and in which Z is selected from the group consisting of halogen, alkyl, amino, alkoxy of 1 to 4 carbon atoms, and acyl.

2. The process of claim 1, in which R contains from 2 to 4 carbon atoms.

3. The process of claim 2, in which the plant is fed by imidazolidone-2.

4. The process of claim 1, in which the plant is fed by a compound of the formula

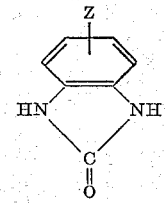

5. The process of claim 1, in which the plant is fed by a compound in which R is the radical

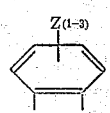

wherein Z is methyl.

6. A process for stimulating plant growth which comprises feeding the plant in an amount sufficient to stimulate the growth of the plant but in an amount insufficient to exert a herbicidal action by supplying to the seed required for one hectar 0.5 to 100 grams of a compound of the formula

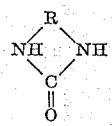

wherein R is selected from the group consisting of

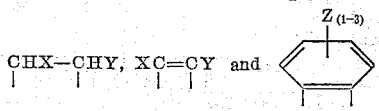

in which X and Y are selected from the group consisting of hydrogen, alkyl of 1 to 4 carbon atoms, furyl, thienyl, pyridyl and aryl, and in which Z is selected from the group consisting of halogen, alkyl, amino, alkoxy of 1 to 4 carbon atoms and acyl.

7. The process of claim 6, wherein the seed required for one hectar is supplied with the compound of claim 1 in an amount of 1 to 75 g.

8. A process for stimulating plant growth which comprises feeding the plant a composition comprising (1) a compound of the formula

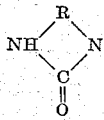

wherein R is selected from the group consisting of

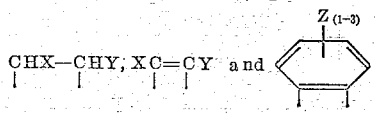

in which X and Y are selected from the group consisting of hydrogen, alkyl of 1 to 4 carbon atoms, furyl, thienyl, pyridyl and aryl, and in which Z is selected from the group consisting of halogen, alkyl, amino, alkoxy of 1 to 4 carbon atoms, and acyl, and (2) a solid carrier for said compound in a quantity permitting application of said compound in the small amount sufficient to stimulate the growth of the plant without exerting a herbicidal action.

9. A process for stimulating plant growth which comprises feeding the plant a composition comprising (1) a compound of the formula

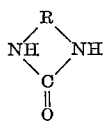

wherein R is selected from the group consisting of

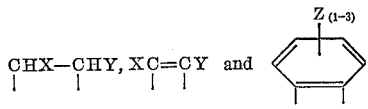

in which X and Y are selected from the group consisting of hydrogen, alkyl of 1 to 4 carbon atoms, furyl, thienyl, pyridyl and aryl, and in which Z is selected from the group consisting of halogen, alkyl, amino, alkoxy of 1 to 4 carbon atoms, and acyl, and (2) an aqueous carrier for said compound in a quantity permitting application of said compound in the small amount sufficient to stimulate the growth of the plant without exerting a herbicidal action.

10. A process for stimulating plant growth which comprises feeding the plant a composition comprising a compound of the formula

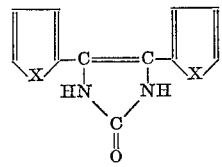

wherein X is an element of group VI of the periodic table having an atomic weight from 16 to 32, and a diluent carrier for said compound in a quantity permitting application of said compound in the small amount sufficient to stimulate the growth of the plant without exerting a herbicidal action.

References Cited by the Examiner

UNITED STATES PATENTS

| | | | |
|---|---|---|---|
| 1,950,068 | 3/1934 | Spangenberg | 71—2.45 |
| 1,950,701 | 3/1934 | Spangenberg | 71—2.25 |
| 2,733,988 | 2/1956 | Searle | 71—2.7 |
| 2,785,176 | 3/1957 | Vebra | 167—22 |
| 2,860,962 | 11/1958 | Bluestone | 71—2.5 |
| 2,874,149 | 2/1959 | Applegath et al. | 260—251 |
| 2,892,843 | 6/1959 | Levine | 260—309.7 |
| 2,981,739 | 4/1961 | Bimber | 71—2.5 |
| 3,001,860 | 9/1961 | Bimber | 71—2.5 |

FOREIGN PATENTS 360,843  4/1962  Switzerland.

OTHER REFERENCES

Aklgren et al., Principles of Weed Control, John Wiley and Sons, Inc., New York, 1952, page 85.

LEWIS GOTTS, *Primary Examiner.*

MAURICE A. BRINDISI, *Examiner.*